(12) United States Patent
Rinaolo et al.

(10) Patent No.: US 8,564,165 B2
(45) Date of Patent: Oct. 22, 2013

(54) CENTERLINE GENERATOR SUPPORT SYSTEM AND METHOD OF ELEVATING A CENTERLINE GENERATOR FROM A SUPPORT SURFACE

(75) Inventors: Ronald Joseph Rinaolo, Amsterdam, NY (US); Jayan Kaadaapuram George, Glenville, NY (US); Donald Michael Ronca, Clifton Park, NY (US); John Russell Yagielski, Scotia, NY (US)

(73) Assignee: General Electric Company, Schenectady, NY (US)

( * ) Notice: Subject to any disclaimer, the term of this patent is extended or adjusted under 35 U.S.C. 154(b) by 334 days.

(21) Appl. No.: 13/045,082

(22) Filed: Mar. 10, 2011

(65) Prior Publication Data
US 2012/0228974 A1    Sep. 13, 2012

(51) Int. Cl.
*H02K 5/00* (2006.01)
*H02K 5/26* (2006.01)
*F16M 9/00* (2006.01)

(52) U.S. Cl.
CPC ... *H02K 5/26* (2013.01); *F16M 9/00* (2013.01)
USPC .............. 310/91; 310/426; 310/427; 29/596; 414/785; 414/800; 248/637

(58) Field of Classification Search
CPC .............. H02K 5/00; H02K 5/26; F16M 9/00
USPC ........ 310/91, 426, 427; 29/596; 414/800, 785
See application file for complete search history.

(56) References Cited

U.S. PATENT DOCUMENTS

| | | | | |
|---|---|---|---|---|
| 3,878,708 A * | 4/1975 | Kralowetz et al. | | 72/407 |
| 3,940,098 A * | 2/1976 | Takasaki et al. | | 248/602 |
| 4,303,220 A * | 12/1981 | Gallasch | | 248/679 |
| 5,331,243 A * | 7/1994 | Halbohm | | 310/91 |
| 5,609,018 A * | 3/1997 | Brem et al. | | 60/39.182 |
| 5,701,731 A * | 12/1997 | Brem et al. | | 60/772 |
| 6,084,331 A * | 7/2000 | Reinhardt et al. | | 310/91 |
| 6,164,615 A * | 12/2000 | Basham | | 248/678 |
| 7,246,717 B2 * | 7/2007 | Rodgers et al. | | 220/560.01 |
| 7,281,308 B2 * | 10/2007 | Ashar et al. | | 29/426.3 |
| 2003/0132635 A1* | 7/2003 | Ganimian | | 290/1 R |
| 2004/0163333 A1* | 8/2004 | Whittaker et al. | | 52/126.5 |
| 2005/0150095 A1* | 7/2005 | Ashar et al. | | 29/426.3 |
| 2005/0218288 A1* | 10/2005 | Allen et al. | | 248/637 |
| 2005/0235479 A1* | 10/2005 | Allen et al. | | 29/596 |
| 2009/0202350 A1* | 8/2009 | Pedersen | | 416/146 R |
| 2009/0280010 A1* | 11/2009 | Pederson | | 416/1 |
| 2010/0072757 A1* | 3/2010 | Kealy et al. | | 290/1 A |
| 2010/0150693 A1* | 6/2010 | Frassinelli et al. | | 414/800 |
| 2012/0228974 A1* | 9/2012 | Rinaolo et al. | | 310/91 |

FOREIGN PATENT DOCUMENTS

EP    2196431 A2    6/2010
JP    2009-052594 A    3/2009

OTHER PUBLICATIONS

Search Report issued in connection with GB Application No. 12036940.0, Jun. 15, 2012.

* cited by examiner

*Primary Examiner* — John K Kim
(74) *Attorney, Agent, or Firm* — Cantor Colburn LLP

(57) ABSTRACT

A generator support system for a centerline mounted generator includes a generator support member configured and disposed to support a generator upon a support surface. The generator support member includes at least one lifting element having a lifting surface that faces the support surface.

10 Claims, 5 Drawing Sheets

US 8,564,165 B2

CENTERLINE GENERATOR SUPPORT SYSTEM AND METHOD OF ELEVATING A CENTERLINE GENERATOR FROM A SUPPORT SURFACE

BACKGROUND OF THE INVENTION

The subject matter disclosed herein relates to the art of generators and, more particularly, to a centerline generator support system.

In many installations, a generator is mounted to a platform along a centerline of a turbomachine. The turbomachine includes a shaft that extends along the centerline and is operatively connected to the generator. When the turbomachine is in operation, the shaft rotates to drive the generator. Occasionally, the generator requires maintenance and inspection. Certain maintenance and inspection tasks require that the generator be separated from the turbomachine and removed from the platform. Removing the generator from the platform requires equipment and space, as well as compliance with various codes and standards while in a maintenance position.

The equipment includes lifting devices that are not only capable of raising heavy loads, but of also transitioning the entire generator to the maintenance position. At the maintenance position, the generator is lowered either onto a maintenance support or onto a floor. The lifting device can take the form of a dedicated overhead crane. As the need for maintenance and inspection is infrequent, the need for a dedicated overhead crane, which is typically built into a framework of the installation, represents a large capital expense having a lengthy payback period. Other lifting devices include portable cranes that are brought in on an as needed basis. Regardless of type, lifting a centerline generator is a time consuming and expensive operation.

BRIEF DESCRIPTION OF THE INVENTION

According to one aspect of the exemplary embodiment, a generator support system for a centerline mounted generator includes a generator support member configured and disposed to support a generator upon a support surface. The generator support member includes at least one lifting element having a lifting surface that faces the support surface.

According to another aspect of the exemplary embodiment, a method of elevating a centerline mounted generator from a support surface includes positioning a lifting device between a lifting surface provided on a generator support member and a support surface, extending a lifting portion of the lifting device, and elevating the generator from the support surface with the lifting portion.

According to yet another aspect of the exemplary embodiment, a generator system includes a centerline mounted generator having a housing, and a generator support member configured and disposed to support the generator upon a support surface. The generator support member includes at least one lifting element having a lifting surface that faces the support surface.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
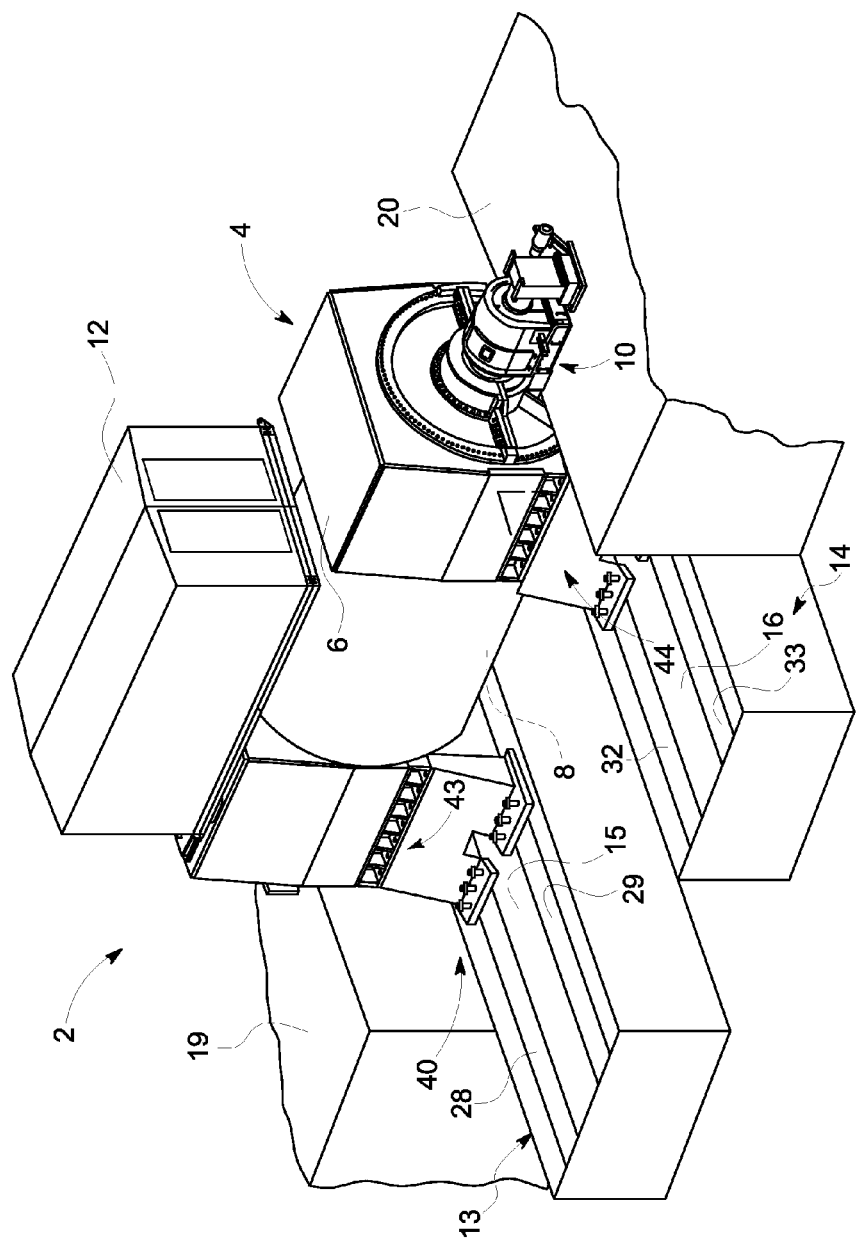
FIG. 1 is perspective view of a centerline-mounted generator including a generator support system in accordance with an exemplary embodiment.

With reference to FIG. 1, a generator system constructed in accordance with an exemplary embodiment is indicated generally at 2. Generator system 2 includes a centerline-mounted generator 4 having a housing 6 which surrounds a stator 8. Generator 4 is also shown to include a brush enclosure housing 10 and a generator terminal enclosure 12. As will be discussed more fully below, generator 4 is supported upon first and second support structures 13 and 14 having corresponding support surfaces 15 and 16. First and second support structures 13 and 14 are positioned between first and second concrete piers 19 and 20. Generator 4 is operatively connected, along a centerline, to a turbomachine (not shown).

In accordance with the exemplary embodiment shown, support structure 13 includes first and second rail elements 28 and 29 shown embedded in support surface 15. Similarly, support structure 14 includes first and second rail elements 32 and 33 embedded in support surface 16. In further accordance with the exemplary embodiment shown, generator system 2 includes a generator support system 40. Generator support system 40 includes four generator support members, two of which are shown at 43 and 44. Generator support members 43 and 44 support and position generator 2 upon first and second support surfaces 15 and 16 as will be detailed more fully below. At this point it should be understood that the number and position of the generator support members can vary.

Reference will now be made to FIGS. 2-5 in describing generator support member 43 with an understanding that generator support member 44 includes corresponding structure. Generator support member 43 includes a first end 53 that abuts first support surface 15 and a second end 54 that abuts generator 4. Second end 54 can be secured to centerline-mounted generator 4 using a variety of fastening systems (not shown). Generator support member 43 also includes a first side 56 and a second side 57. First and second ends 53, 54, and first and second sides 56, 57 are separated by a central web portion 60. Generator support member 43 is secured to first support structure 13 by a plurality of fastener members 62-67 and a corresponding plurality of fastener elements 69-74. Fastener members 62-67 take the form of externally threaded rods that are anchored in first support structure 13. Fastener elements 69-74 take the form of threaded nuts that are operatively engaged with fastener members 62-67.

In accordance with the exemplary embodiment shown, generator support member 43 includes a lifting element 80 that takes the form of a lifting pocket 83 formed in central web portion 60. Lifting pocket 83 includes a lifting member 86 having a first or lifting surface 88 that faces first support surface 15 and a second surface 89. Lifting pocket 83 is also shown to include a support member 92 that extends between second surface 89 of lifting member 86 and second end 54. Support member 92 provides additional structural support to lifting member 86 when generator 4 is raised from first and second support surfaces 15 and 16 as will be described more fully below.

Figure 2:
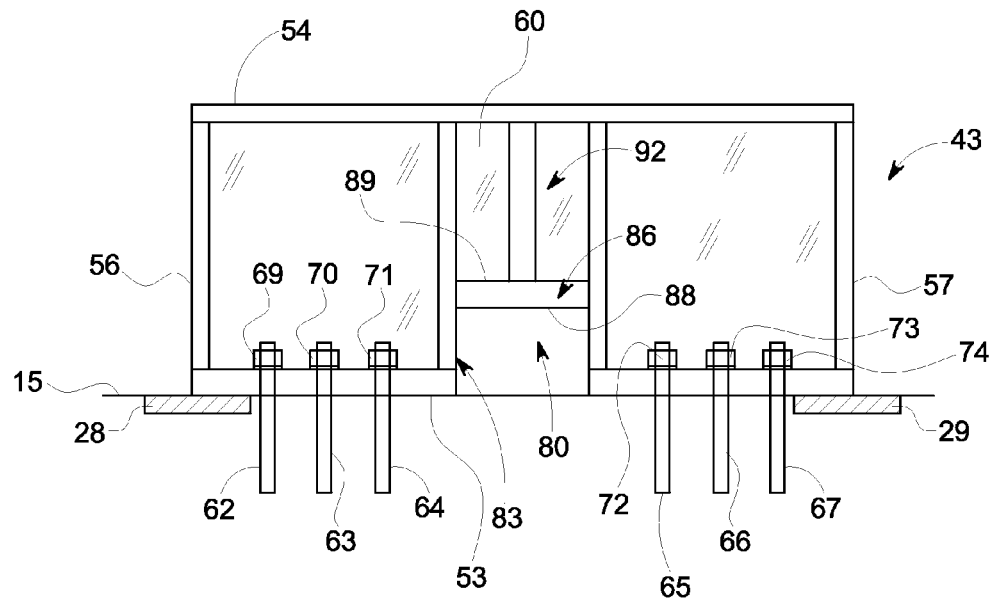
FIG. 2 is an elevational view of a generator support member including a lifting element that takes the form of a lifting pocket in accordance with an aspect of the exemplary embodiment.
Figure 3:
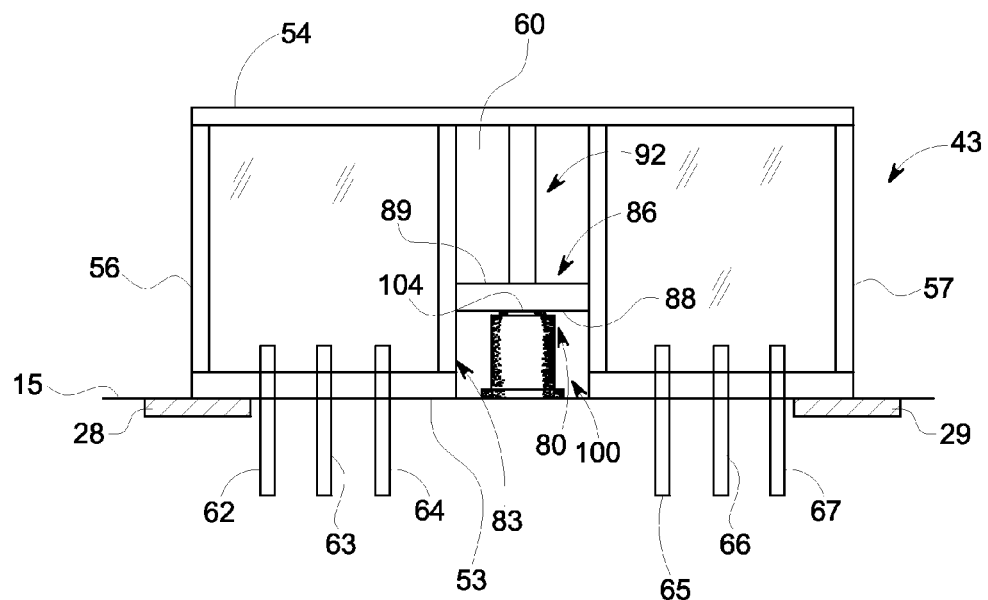
FIG. 3 is an elevational view of the generator support member of FIG. 2 illustrating a lifting device arranged in the lifting pocket.
Figure 4:
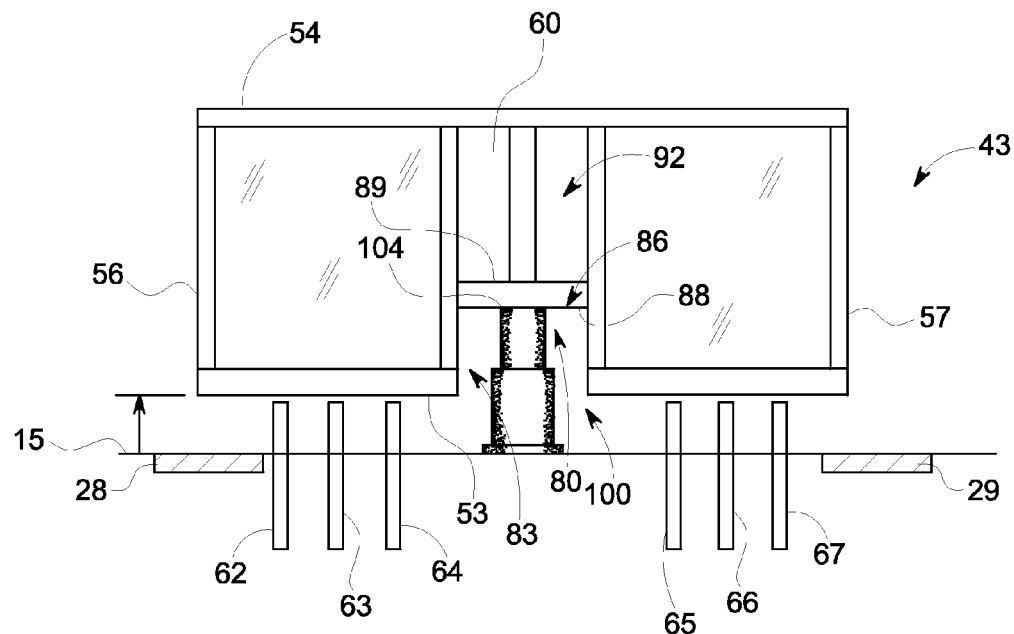
FIG. 4 is an elevational view of the generator support member of FIG. 3 illustrating a lifting portion extending from the lifting device to elevate the generator from a support surface.
Figure 5:
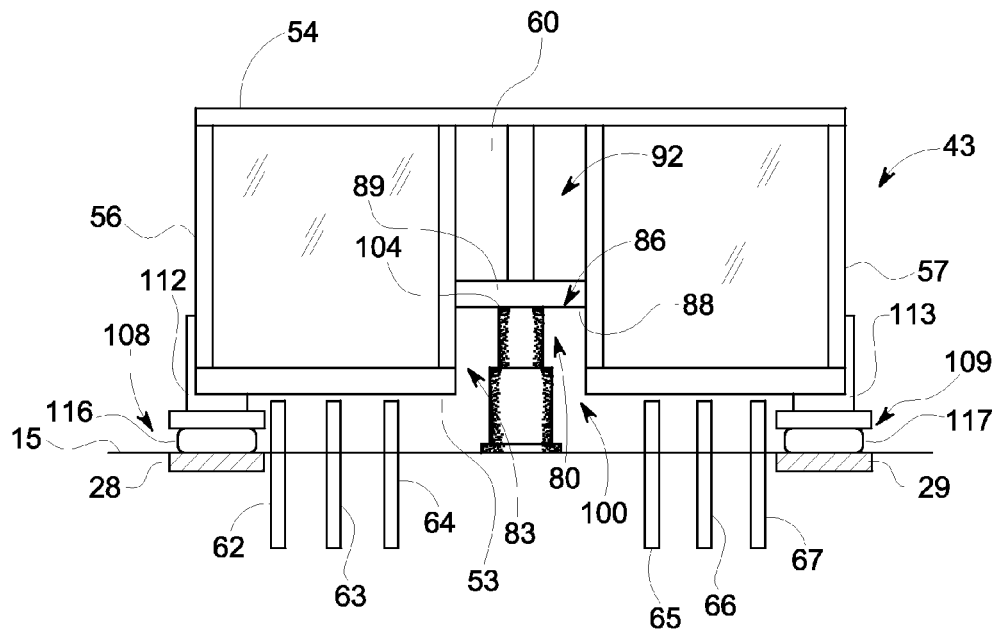
FIG. 5 is an elevational view of the generator support member of FIG. 4 shown lowered onto a roller member positioned between the generator support member and the support surface.
Figure 6:
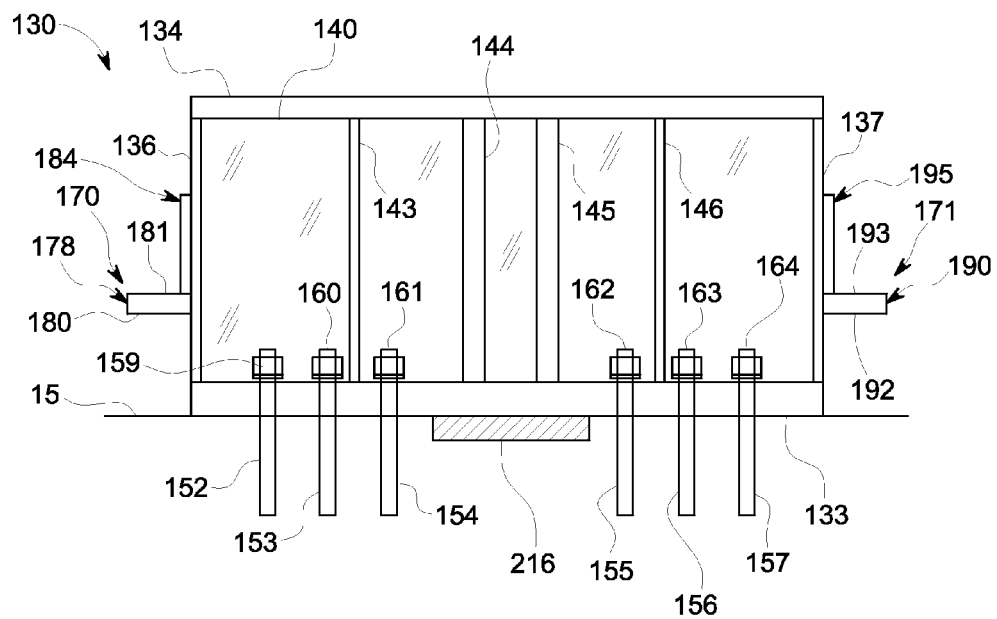
FIG. 6 is an elevational view of a generator support member including first and second lifting elements in accordance with another aspect of the exemplary embodiment.

In further accordance with the exemplary embodiment shown, when it is desired to raise generator 2 from a first position, wherein generator support member 43 rests upon first support surface 15 such as shown in FIG. 2, fastener elements 69-74 are removed from fastener members 62-67 and a lifting device 100 is placed in lifting pocket 83 such as shown in FIG. 3. At this point, a lifting portion 104 is caused to extend from lifting device 100 and moved into engagement with lifting surface 88 as shown in FIG. 4 causing generator support member 43 to be raised upward until first end 53 clears fastener members 62-67 or a lower most element (not separately labeled) clears first support surface 15. Once generator support member is sufficiently elevated, first and second roller members 108 and 109 are positioned between first support surface 15 and first end 53 as shown in FIG. 5. Roller members 108 and 109 are secured to first and second ends 53 and 54 by corresponding attachment members 112 and 113. Once attachment members 112 and 113 are secured, generator support member 43 is lowered onto first support surface 15. In the embodiment shown, each roller member 108 and 109 includes a corresponding roller element or wheel 116, 117 that rests upon rail elements 28 and 29 respectively. Once each generator support member is similarly elevated and supported, generator 4 can be shifted upon first and second support structures 13 and 14 to a maintenance position for any necessary servicing.

Reference will now be made to FIGS. 6-9 in describing a generator support member 130 in accordance with another exemplary embodiment. Generator support member 130 includes a first end 133 that is in contact with first support surface 15 and a second end 134 that is in contact with generator 4. Generator support member 130 also includes a first side 136 and a second side 137. First and second ends 133, 134, and first and second sides 136, 137 are separated by a central web portion 140. Generator support member 130 is also shown to include a plurality of support members 143-146 that extend between first and second ends 133 and 134 to provide additional structural support. In a manner similar to that described above, generator support member 130 is secured to first support structure 13 by a plurality of fastener members 152-157 and a corresponding plurality of fastener elements 159-164. Fastener members 152-157 take the form of externally threaded rods that are anchored in first support structure 13. Fastener elements 159-164 take the form of threaded nuts that are operatively engaged with fastener members 152-157.

In accordance with the exemplary embodiment shown, generator support member 130 includes a first lifting element 170 mounted to first side 136 and a second lifting element 171 mounted to second side 137. First lifting element 170 includes a lifting member 178 having a first or lifting surface 180 that faces first support surface 15 and a second surface 181. Lifting member 178 is secured to first side 136 by an attachment element 184. Similarly, second lifting element 171 includes a lifting member 190 having a first or lifting surface 192 that faces first support surface 15 and a second surface 193. Lifting member 190 is secured to second side 137 by an attachment element 195.

Figure 7:
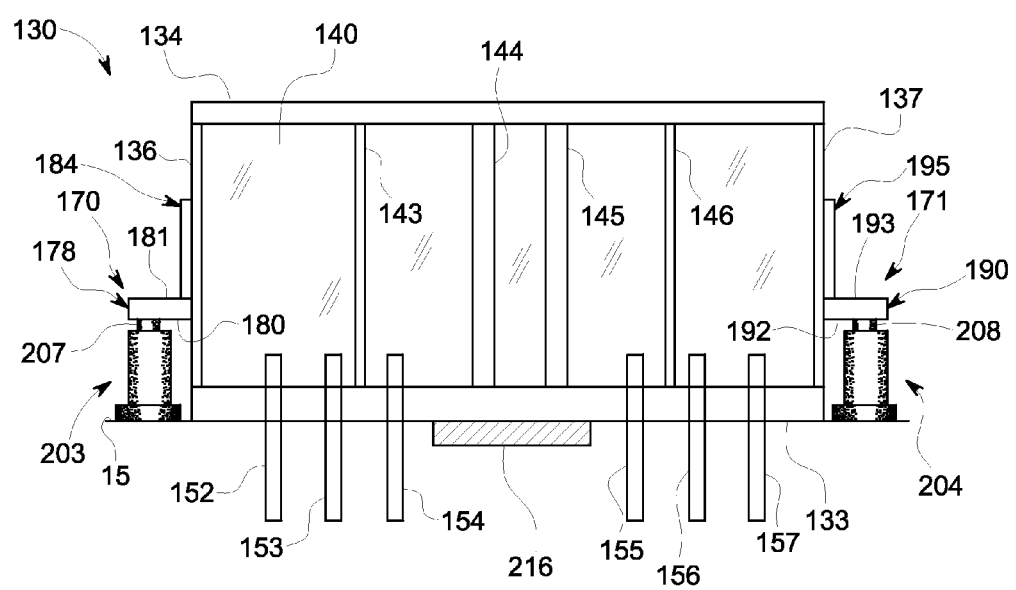
FIG. 7 is an elevational view of the generator support member of FIG. 6 illustrating first and second lifting devices positioned between the support surface and corresponding ones of the first and second lifting elements.
Figure 8:
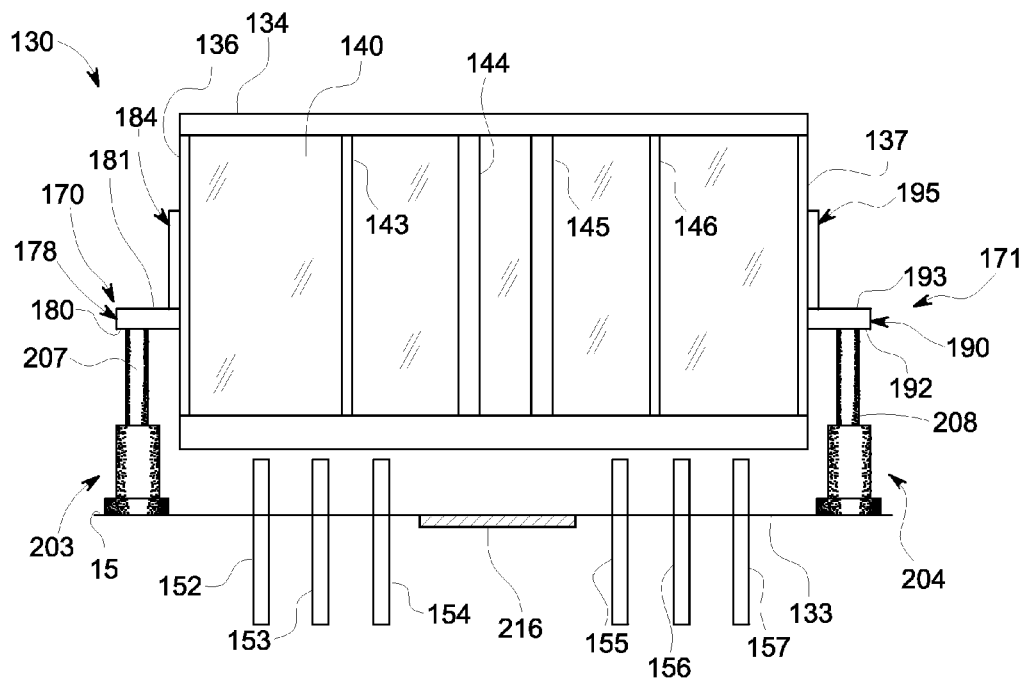
FIG. 8 is an elevational view of the generator support member of FIG. 7 illustrating first and second lifting portions extending from respective ones of the first and second lifting devices to the first and second lifting elements to elevate the generator from the support surface.
Figure 9:
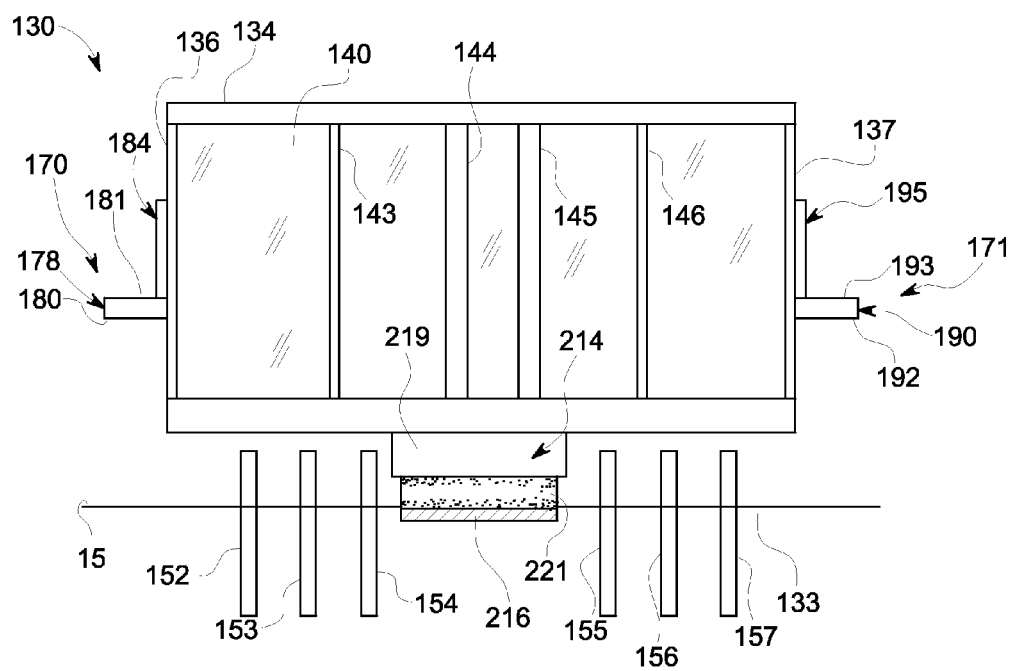
FIG. 9 is an elevational view of the generator support member of FIG. 7 shown lowered onto a roller member positioned between the generator support member and the support surface.

When it is necessary to raise generator 4 from support structure 13, fastener elements 159-164 are removed from fastener members 152-157, and first and second lifting devices 203 and 204 are placed between first support surface 15 and respective ones of first and second lifting elements 170, 171 as shown in FIG. 7. At this point, a first lifting portion 207 is extended from first lifting device 203. At the same time, a second lifting portion 208 is extended from second lifting device 204. First and second lifting portions 207 and 208 continue to extend until first end 133 clears fastener members 152-157. Once clear, a roller member 214 is positioned between first support surface 15 and first end 133 and centered upon a rail element 216. In a manner similar to that described above, rail element 216 is embedded in first support surface 15. Roller member 214 includes an attachment member 219 that supports a roller element or wheel 221. Attachment member 219 is secured to first end 133 with roller element 211 being positioned above rail element 216. In addition to serving as an interface, attachment member 219 maintains a desired height of first end 133 above fastener members 152-157. Once in place, generator support member 130 is lowered causing roller element 221 to rest upon rail element 216. Once all generator support members are similarly arranged, generator 4 can be rolled or transitioned along support structures 13 and 14 to a maintenance position for servicing.

At this point it should be understood that the exemplary embodiments provide a system for raising and translating a generator without the need for costly capital equipment such as overhead cranes. The system can employ a wide range of available lifting devices to raise and position each support member on a roller member or other device that can transition along a rail or other substantially planar surface. Once all roller members are in position, the generator can be readily moved to a maintenance position using available equipment. In the maintenance position, the generator can either rest on a support surface such as a floor, or be placed upon a support structure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A generator support system for a centerline mounted generator, the generator support system comprising:
a generator support member configured and disposed to support a generator upon a support surface, the generator support member including at least one lifting element having a lifting surface that faces the support surface the at least one lifting element comprising at least one lifting pocket formed in the generator support member.

2. The generator support system according to claim 1, wherein the generator support member includes a first end, a second end, a first side and a second side, the first and second ends and first and second sides being separated by a central web portion, the first end being joined to the support surface through at least one fastener member.

3. The generator support system according to claim 2, wherein the at least one lifting pocket is formed in the central web portion.

4. The generator support system according to claim 1, further comprising: a lifting device positioned between the support surface and the lifting surface, the lifting device being configured and disposed to raise the generator support member from the support surface.

5. The generator support system according to claim 1, further comprising: a roller member arranged between the generator support member and the support surface.

6. The generator support system according to claim 5, further comprising: a rail element arranged at the support surface, the roller member being configured and disposed to translate over the rail element while supporting a generator.

7. The generator support system according to claim 6, wherein the rail element is embedded in the support surface.

8. A generator system comprising:
a centerline mounted generator having a housing; and
a generator support member configured and disposed to support the generator upon a support surface, the generator support member including at least one lifting element having a lifting surface that faces the support surface, the at least one lifting element comprising a lifting pocket formed in the generator support member.

9. The generator system according to claim 8, further comprising: a lifting device positioned between the support surface and the lifting surface, the lifting device being configured and disposed to raise the generator support member from the support surface.

10. The generator system according to claim 8, further comprising: a roller member arranged between the generator support member and the support surface.

* * * * *